United States Patent
Balasingh et al.

(10) Patent No.: US 9,560,129 B2
(45) Date of Patent: Jan. 31, 2017

(54) PEER-TO-PEER GROUP RE-FORMATION

(71) Applicant: GOOGLE TECHNOLOGY HOLDINGS LLC, Mountain View, CA (US)

(72) Inventors: Binesh Balasingh, Bangalore (IN); Viji Alexander, Bangalore (IN); Gabriel B. Burca, Palatine, IL (US); Ranjeet Gupta, Chicago, IL (US); Eric J. Hefner, Lombard, IL (US); Mary K. Hor-Lao, Vernon Hills, IL (US); Ishwara Ja, Bangalore (IN); Douglas A. Lautner, Round Lake, IL (US); Sudhir C. Vissa, Bensenville, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 352 days.

(21) Appl. No.: 14/341,970

(22) Filed: Jul. 28, 2014

(65) Prior Publication Data
US 2016/0028802 A1    Jan. 28, 2016

(51) Int. Cl.
H04L 29/08    (2006.01)
H04L 12/26    (2006.01)
H04W 84/20    (2009.01)

(52) U.S. Cl.
CPC ......... *H04L 67/1046* (2013.01); *H04L 43/065* (2013.01); *H04L 67/1044* (2013.01); *H04L 67/1051* (2013.01); *H04W 84/20* (2013.01)

(58) Field of Classification Search
USPC .................. 709/224, 230, 204, 228, 231
See application file for complete search history.

(56) References Cited

U.S. PATENT DOCUMENTS

| | | | |
|---|---|---|---|
| 7,969,997 B1* | 6/2011 | Noh ........................ | H04L 12/18 370/256 |
| 8,249,102 B2* | 8/2012 | Koren ................. | H04L 65/1006 370/466 |
| 9,078,121 B2* | 7/2015 | Georgescu | |
| 2004/0162992 A1* | 8/2004 | Sami ................. | H04L 29/12009 726/13 |
| 2005/0060406 A1* | 3/2005 | Zhang ................. | H04L 12/2602 709/225 |

(Continued)

FOREIGN PATENT DOCUMENTS

| | | |
|---|---|---|
| WO | 2011/130630 A1 | 10/2011 |
| WO | 2013/162496 A1 | 10/2013 |

OTHER PUBLICATIONS

European Patent Office, International Search Report and Written Opinion for PCT Application No. PCT/US2015/042437 (related to above-captioned patent application), mailed Jan. 14, 2016.

*Primary Examiner* — Jude Jean Gilles
(74) *Attorney, Agent, or Firm* — Faegre Baker Daniels LLP

(57) ABSTRACT

Disclosed are peer-to-peer group re-formation techniques. The techniques enable automatic reformation of a peer-to-peer group when the Group Owner ("GO") device is lost. To do so, the techniques enable selection of a one of the peer devices in the peer-to-peer group as a next GO device responsive to detecting the loss of the original GO device. Then, the peer device selected as the next GO device automatically activates as the GO device, while the other peer devices scan for and connect to the next GO device.

20 Claims, 12 Drawing Sheets

(56) References Cited

U.S. PATENT DOCUMENTS

| | | |
|---|---|---|
| 2008/0243551 A1* | 10/2008 | Subramaniam ......... G06F 19/28 |
| | | 705/3 |
| 2010/0121872 A1* | 5/2010 | Subramaniam ......... G06F 19/28 |
| | | 707/769 |
| 2012/0158981 A1* | 6/2012 | Desai .................. H04L 67/1093 |
| | | 709/230 |
| 2013/0132500 A1 | 5/2013 | Vandwalle et al. |
| 2013/0191546 A1* | 7/2013 | Lyle .................... H04L 65/4038 |
| | | 709/228 |
| 2013/0252656 A1 | 9/2013 | Lee et al. |
| 2014/0078928 A1 | 3/2014 | Verma et al. |
| 2014/0196140 A1* | 7/2014 | Gong .................... H04L 67/104 |
| | | 726/10 |
| 2014/0201280 A1* | 7/2014 | Qi ........................ H04W 4/005 |
| | | 709/204 |

* cited by examiner

PEER-TO-PEER GROUP RE-FORMATION

TECHNICAL FIELD

The present disclosure is related generally to peer-to-peer groups and more particularly to re-forming, or maintaining, a peer-to-peer group when the Group Owner ("GO") (also called the "master") is lost.

BACKGROUND

In the case of peer-to-peer networks with multiple devices, conventional wireless network specifications detail which device originally becomes the GO of the group but do not specify how to "re-form" the group automatically if the GO is lost or dissolved.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
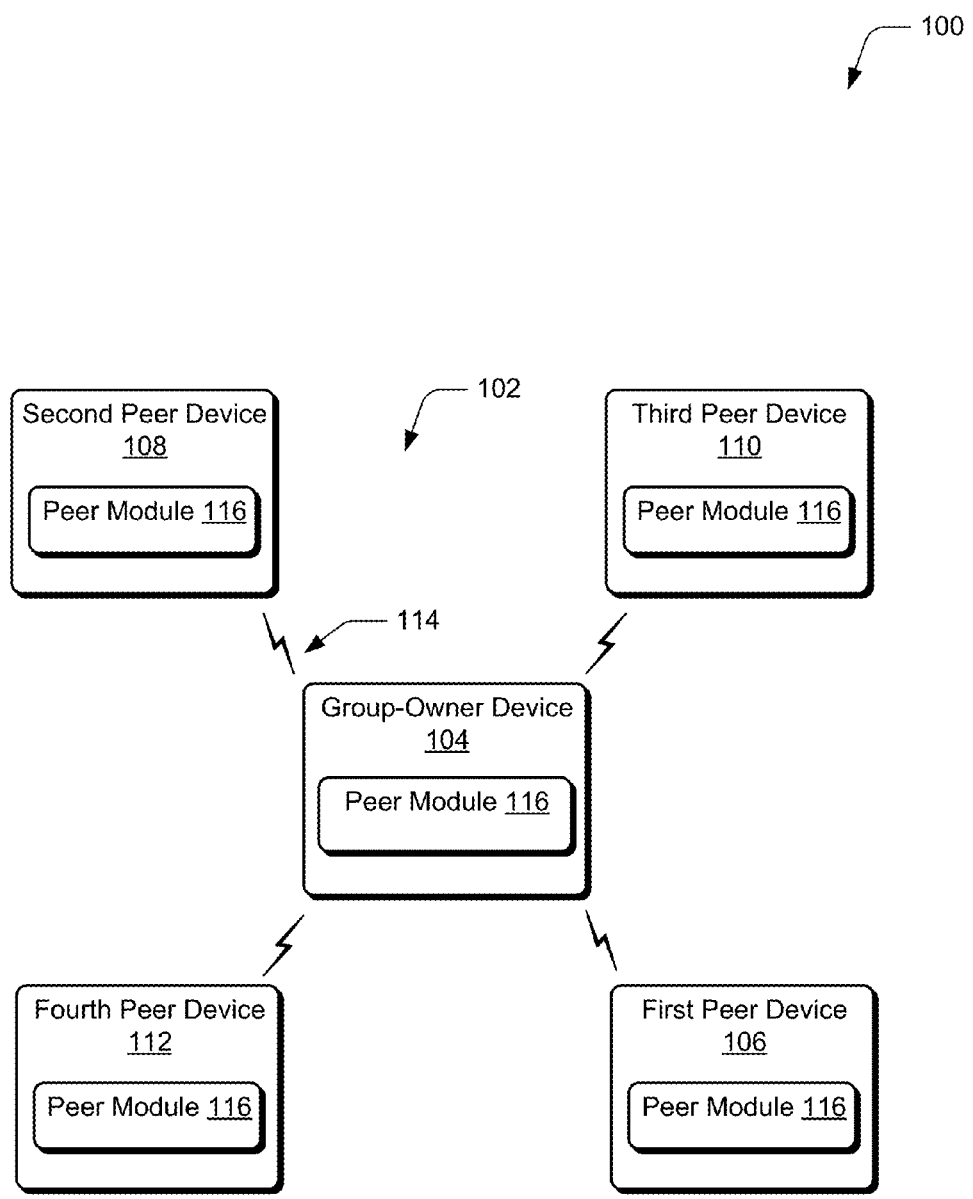
FIG. 1 is an overview of a representative environment in which the present techniques may be practiced.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Wireless networks under infrastructure mode, such as enterprise Wi-Fi™ networks, offer handovers to connected client devices by coordinating passwords using a backend network or a simple pre-shared security key with neighboring wireless networks.

In the case of peer-to-peer networks with two or more devices, conventional wireless network specifications detail which device originally becomes the GO of the group but do not specify how to "re-form" the group automatically if the GO is lost or dissolved.

For example, in a Wi-Fi™ Direct group, the GO has the burden of maintaining the group. To do so, the GO device actively beacons the other peer devices in the group which may be attached to the GO device in a simple star topology. In the event the GO device stops beaconing, all peer devices lose their connectivity to the group and hence their connectivity to each other.

There are a variety of common factors which may cause the GO device to stop beaconing. In some cases, the GO device may stop beaconing when the GO device moves out of coverage. In other cases, the GO device may stop beaconing when the device is suddenly powered off, such as via a user- or application-initiated action or battery drain. In either of these cases, connectivity to the GO device is lost.

When the GO device is lost, all peer devices lose their connectivity to the group. Each peer device must then manually search, negotiate, and re-form the group, which may include electing a new GO on a negotiation basis. For applications dealing in peer-to-peer connectivity, this poses an increasingly frustrating problem.

As an example, consider four device users and their devices: Steve with a smartphone, Lance with a laptop, and Tom and Tony each with a tablet. Steve, Lance, Tom, and Tony each attend a meeting with their respective devices. At the meeting, Steve activates his smartphone as GO, and Lance, Tom, and Tony connect to Steve's smartphone with their respective devices to form a peer-to-peer group.

Now, consider that during the meeting Steve gets an urgent phone call and hurries out of the meeting to take the call in private in his office. As Steve moves towards his office, the wireless connection between Steve's smartphone and the other devices in the group may be lost. In conventional peer-to-peer networks, this loss of connectivity by the GO causes the group to be dissolved.

Now, peer-to-peer group re-formation techniques enable automatic reformation of a peer-to-peer group when the GO device is lost. To do so, the techniques enable selection of one of the peer devices in the peer-to-peer group as a next GO device responsive to detecting the loss of the original GO device. Then, the peer device selected as the next GO device automatically activates as the GO device, while the other peer devices scan for and connect to this next GO device.

Referring back to the example above, when Steve leaves the room and moves out of range of the other devices, the peer-to-peer group re-formation techniques may cause Lance's laptop to be activated as the next GO device. Then, Tom's and Tony's tablets each automatically scan for and connect to Lance's laptop to re-form the group. It is to be appreciated, therefore, that the peer-to-peer group re-formation techniques enable automatic and seamless re-formation of peer-to-peer groups without requiring peer devices to restart the negotiation process.

FIG. 1 is an overview of a representative environment 100 in which the present techniques may be practiced. Environment 100 includes a peer-to-peer group 102 with a GO device 104, a first peer device 106, a second peer device 108, a third peer device 110, and a fourth peer device 112.

The devices 104 through 112 may be configured in a variety of ways. For example, each device 104 through 112 may be any type of wired or wireless electronic or computing device, such as a mobile phone, tablet computer, handheld navigation device, portable gaming device, or media playback device. Generally, any of the devices described herein can be implemented with various components, such as a processing system and memory, as well as any number and combination of differing components as further described with reference to the example device shown in FIG. 10.

To form peer-to-peer group 102, each of peer devices 106, 108, 110, and 112 establishes a wireless connection 114 with GO device 104. Once each peer device is connected to GO device 104, the peer devices in peer-to-peer group 102 may directly communicate with each other.

In one or more implementations, peer-to-peer group 102 is a Wi-Fi Direct™ group. Wi-Fi Direct™, also known as Wi-Fi P2P ("Point-to-Point") is a technology that enables nearby Wi-Fi Direct™ devices to find each other and to form Wi-Fi Direct™ groups to communicate over a peer-to-peer link without wireless access points.

In a Wi-Fi Direct™ group, the GO device acts as an access point in the Wi-Fi infrastructure mode and enables other peer devices to join the group as clients. There are two main methods to establish a GO in the Wi-Fi Direct group. In one approach, the user sets up the GO manually. This method is also known as autonomous GO. In the second method, also called negotiation-based group creation, two peer devices compete based on the GO intent value. The device with higher intent value becomes a GO, and the second peer device becomes a client.

Thus, in environment 100, GO device 104 enables peer devices 106 through 112 to join peer-to-peer group 102. It is to be appreciated, however, that any of devices 104 through 112 may act as the GO device. Further, while peer-to-peer group 102 is illustrated as including five different devices, it is to be appreciated that any number of different devices may join peer-to-peer group 102. Further, peer-to-peer group 102 may be implemented as any type of peer-to-peer network or wireless network that employs master and slave roles for connectivity, where loss of the master results in loss of connectivity for all slaves.

Each of GO device 104 and peer devices 106, 108, 110, and 112 includes a peer module 116, which may be stored in memory and executable by a processor system at each device. Peer module 116 may be implemented as software applications or modules (e.g., computer-executable instructions) stored on computer-readable storage memory, such as any suitable memory device or electronic data storage, and executed with the processing system at each device.

Peer module 116 is representative of functionality to automatically re-form peer-to-peer group 102 when GO device 104 is lost. To do so, peer module 116 is able to detect when GO device 104 is lost, to automatically select a next GO device, and to re-form the group with the next GO device as the GO. In one or more implementations, peer module 116 is executed by a dedicated low power core to coordinate group re-formation without waking up the application processor each time, thereby saving power.

Figure 2:
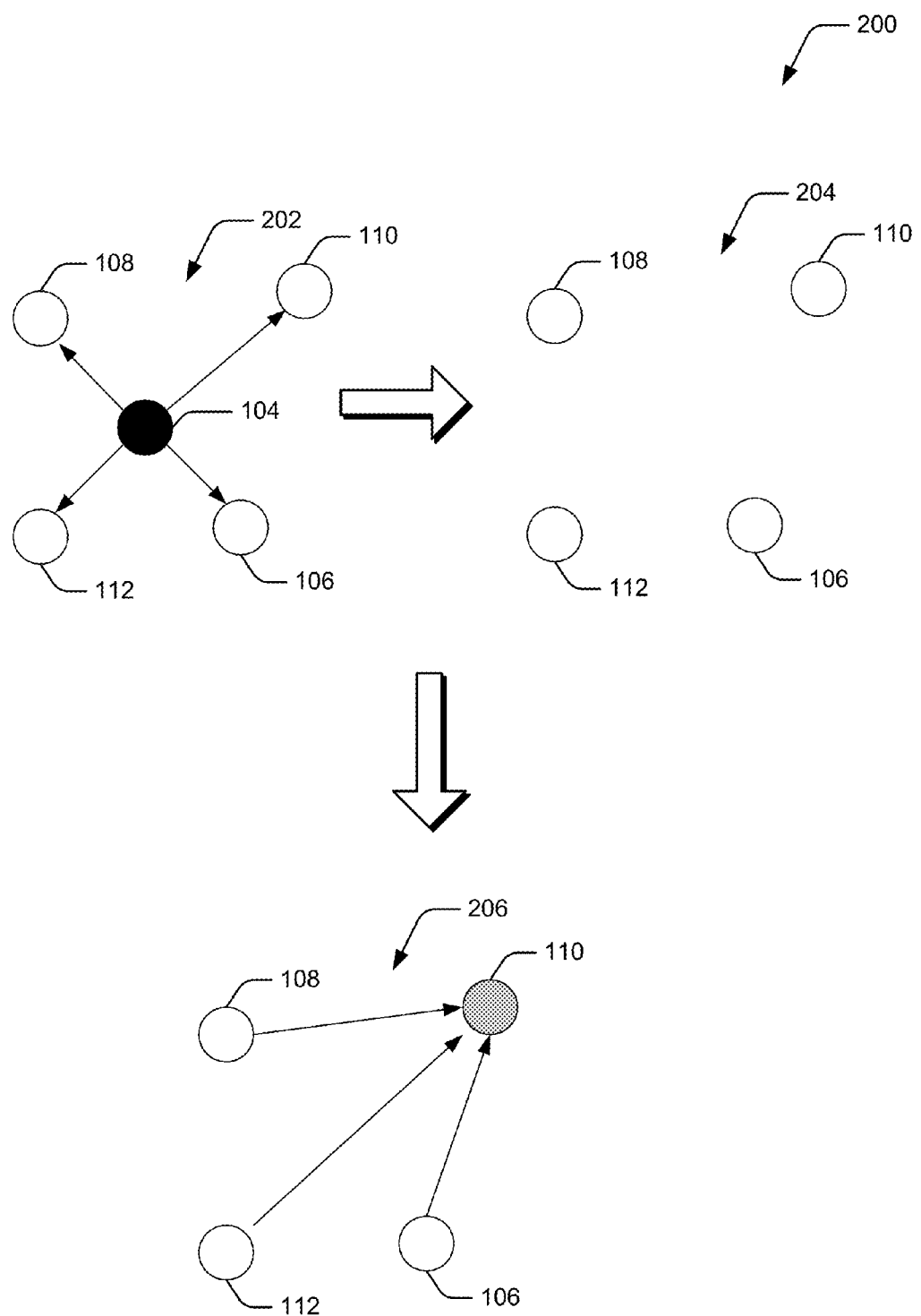
FIG. 2 illustrates an example of re-forming a peer-to-peer group when the GO device is lost.

In order to better understand the concept of peer-to-peer group re-formation, consider FIG. 2 which illustrates an example 200 of re-forming a peer-to-peer group when the GO device is lost.

In this example, at a first stage 202, peer devices 106, 108, 110, and 112 are each wirelessly connected to GO device 104 to form group 102, as illustrated and described in FIG. 1.

At a second stage 204, GO device 104 is lost. As described throughout, GO device 104 can be lost when the wireless connection with the peer devices is lost. In some cases, GO device 104 may be abruptly lost. This may occur, for example, when GO device 104 loses power, such as by being powered off by a user of the device or by losing battery power. In these cases, each peer device in the group may detect the loss of GO device 104 at substantially the same time. For example, when the power is lost, each device will detect the loss of the beacon signal from GO device 104 at substantially the same time.

In other cases, GO device 104 may be gradually lost. This may occur, for example, when GO device 104 moves out of range of the peer devices in the group. In these cases, the peer devices may detect loss of GO device 104 at different times. For example, consider that first peer device 106 is positioned nearby GO device 104 and second peer device 108 is positioned far away from GO device 104. In this example, as GO device 104 begins to move, second peer device 108 may immediately detect the loss of GO device 104, while first peer device 106 may detect the loss of GO device 104 at a later time.

As described above, when GO device 104 is lost, peer module 116 at each peer device detects that GO device 104 is lost by detecting that the beacon signal from GO device 104 is no longer being received.

Responsive to detecting that GO device 104 is lost, peer module 116 at each peer device implements techniques to automatically determine a next GO device. It is to be appreciated that peer module 116 at each of peer devices 106, 108, 110, and 112 is configured to implement the same techniques such that each peer device determines the same peer device as the next GO device.

In example 200, module 116 at each peer device selects third peer device 110 as the next GO device. Thus, at a third stage 206, third peer device 110 activates itself as the GO device (e.g., by activating autonomous GO), and peer devices 106, 108, and 112 each connects to third peer device 110 (now GO 110) to re-form the peer-to-peer group.

Peer module 116 is configured to implement a variety of different techniques to re-form a group, which are described below in sections titled "Device-Identifier Group Re-Formation Techniques," "Device-Detection Group Re-Formation Techniques," "Device-Motion Group Re-Formation Techniques," and "Device-Capabilities Group Re-Formation Techniques." It is to be appreciated that each of these different techniques may be used in combination by peer module 116 to detect loss of the GO device, to select a next GO device, and to re-from the group.

Device-Identifier Group Re-Formation Techniques

In one or more implementations, peer devices in a peer-to-peer group implement device-identifier group re-formation techniques to automatically re-form the group when the GO device is lost. The device-identifier group reformation techniques select a next GO device (from the disconnected peer devices in the group) based on device identifiers of the devices in the group. In one or more implementations, the device identifiers correspond to media access control ("MAC") addresses of the devices.

Figure 3A:
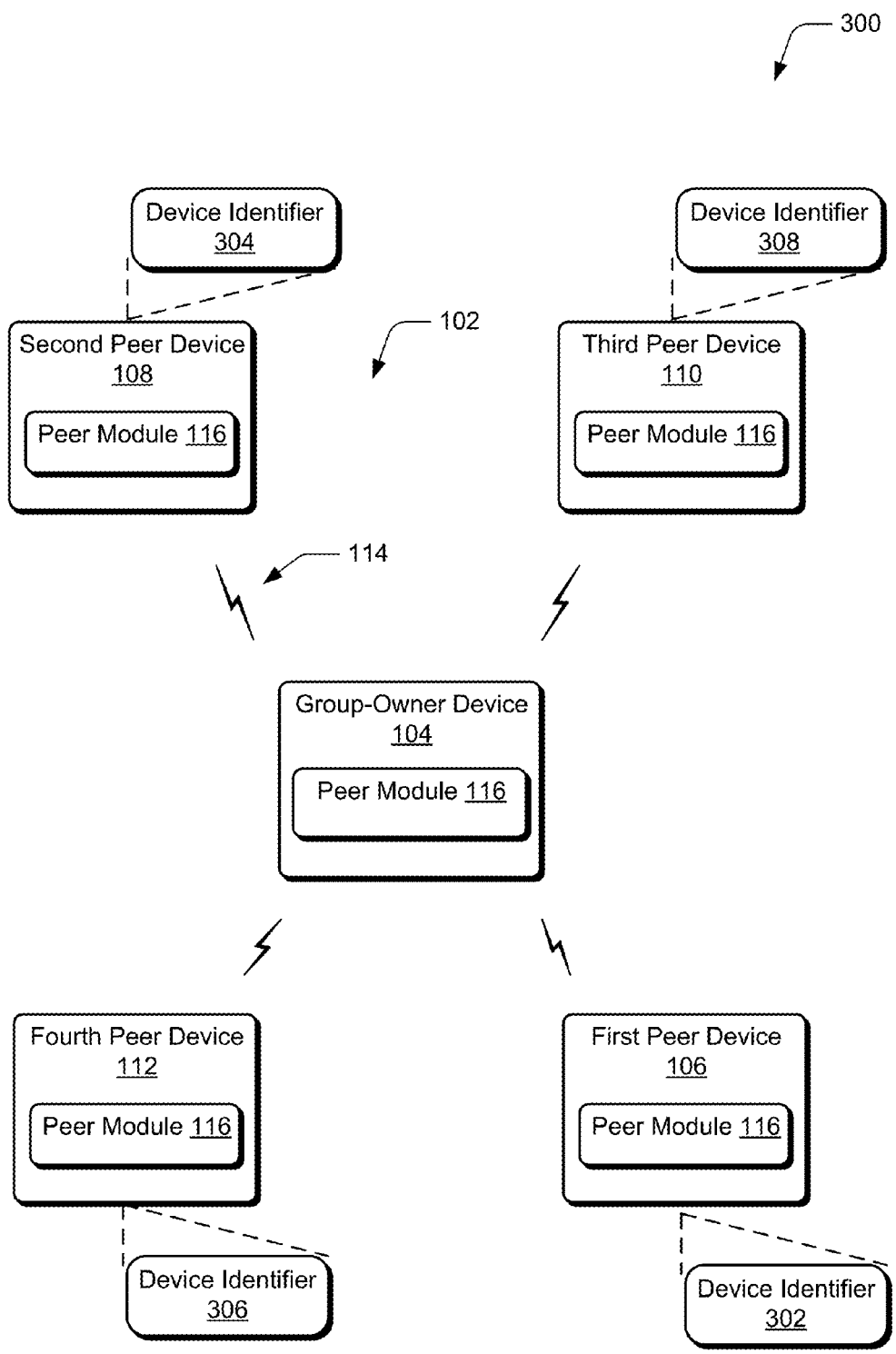
FIGS. 3A and 3B illustrate an example system for re-forming a peer-to-peer group using device-identifier group re-formation techniques.
Figure 3B:
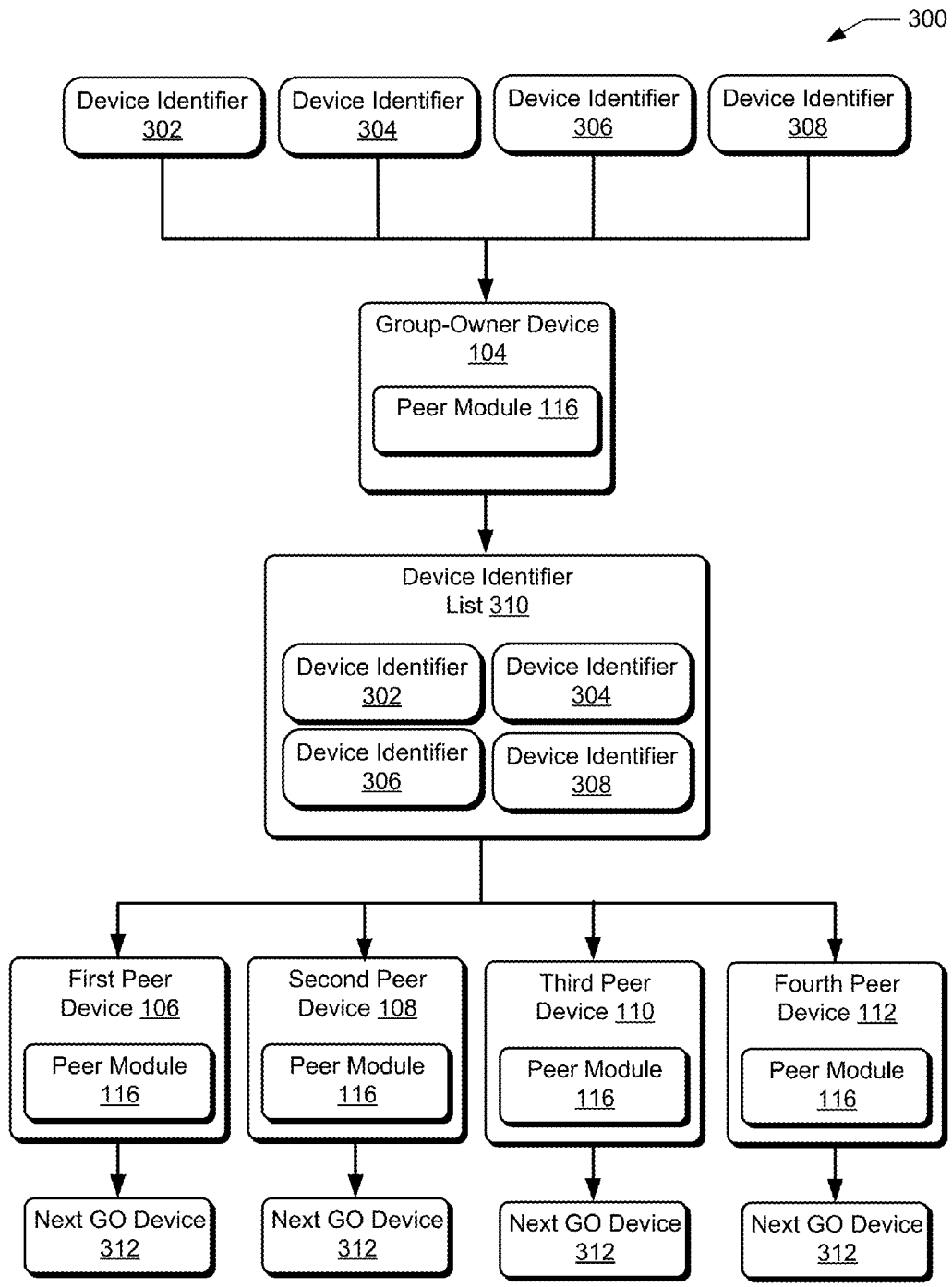

FIGS. 3A and 3B illustrate an example system 300 for re-forming a peer-to-peer group using device-identifier group re-formation techniques. In this example, device identifiers 302, 304, 306, and 308 are associated with respective peer devices 106, 108, 112, and 110. For example, device identifiers 302, 304, 306, and 308 may each correspond to a MAC address of the respective device.

In FIG. 3B, device identifiers 302, 304, 306, and 308 are transmitted to peer module 116 at GO device 104. This may occur, for example, as each peer device connects to GO device 104. Alternately, GO device 104 may request the device identifiers from each peer device after the group is established.

After receiving the device identifiers, peer module 116 at GO device 104 generates a device-identifier list 310 which associates each of peer devices 106, 108, 110, and 112 with its respective device identifier 302, 304, 308, and 306.

In order to enable the device-identifier group re-formation techniques, peer module 116 at GO device 104 transmits device-identifier list 310 to each peer device in peer-to-peer group 102. GO device 104 may transmit the device-identifier list 310 periodically or responsive to receiving a request from one of the peer devices in peer-to-peer group 102.

Then, when GO device 104 is lost, peer module 116 at each peer device selects the next GO device 312 based on the device identifiers in device-identifier list 310. In one or more implementations, peer module 116 selects the peer device with the highest MAC address as the next GO device. Alternately, however, the next GO device may be selected in some other way based on the device identifiers. For example, in one or more implementations, peer module 116 selects the peer device with the lowest MAC address as the next GO device 312.

Figure 4:
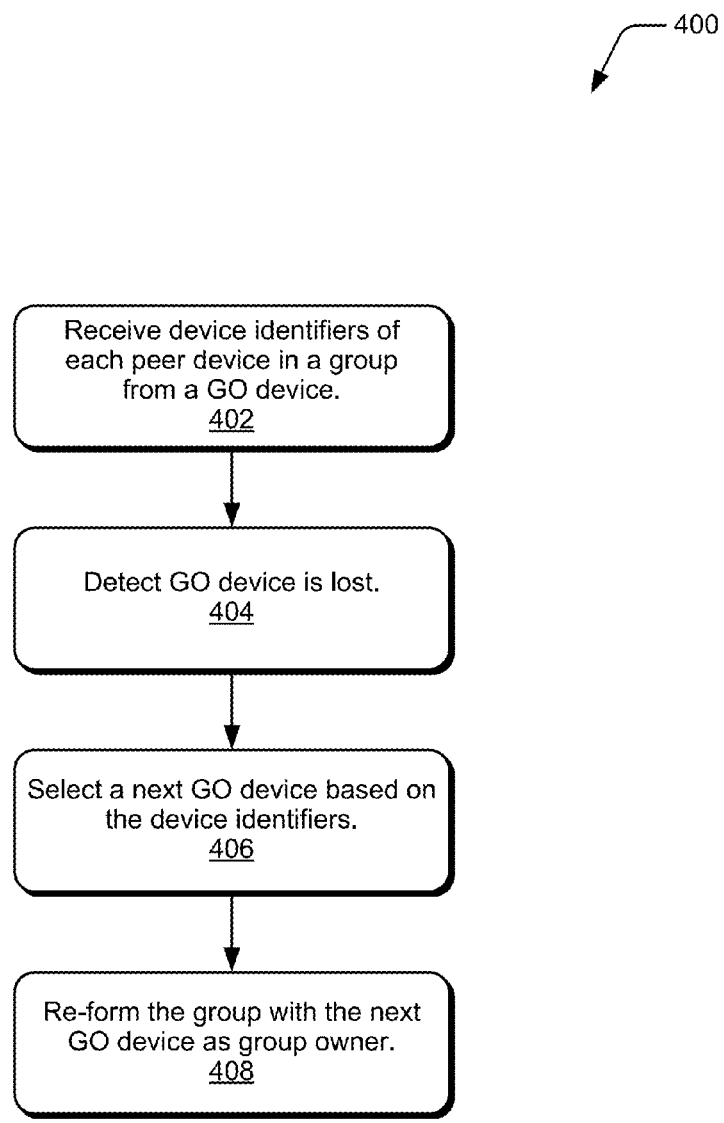
FIG. 4 is a flowchart of a representative method for device-identifier group re-formation techniques.

FIG. 4 is a flowchart of a representative method 400 for device-identifier group re-formation techniques. The order in which operations of this method is shown or described is not intended to be construed as a limitation, and any number or combination of the described method operations can be combined in any order to implement a method, or an alternate, including that illustrated by FIG. 4.

At 402, device identifiers of peer devices in a group are received from a GO device. For example, peer module 116 executed at one or more of peer devices 106 through 112 in peer-to-peer group 102 receives device-identifier list 310 from GO device 104. Device-identifier list 310 includes device identifiers 302, 304, 306, and 308 corresponding to peer devices 106, 108, 112, and 110, respectively.

At 404, loss of the GO device is detected. For example, peer module 116 executed at one or more of peer devices 106 through 112 detects that GO device 104 is lost. The loss of GO device 104 may be detected when GO device 104 stops beaconing.

At 406, a next GO device is selected based on the device identifiers. For example, peer module 116 executed at one or more of peer devices 106 through 112 selects a next GO device based on device identifiers 302, 304, 306, and 308 in device-identifier list 310. In one or more implementations, device identifiers 302, 304, 306, and 308 may correspond to MAC addresses, and the peer device with the highest MAC address is selected as the next GO device. For purposes of this discussion, consider that third peer device 110 has the highest MAC address, and thus peer module 116 at each peer device selects third peer device 110 as the next GO device.

At 408, the group is re-formed with the next GO device as GO. For example, third peer device 110 activates itself as the GO device (e.g., by activating the autonomous GO), and peer devices 106, 108, and 112 each scans for, and connects to, third peer device 110 (now GO) to re-form the group.

It is to be appreciated that the earliest device identifier available to GO device 104 is the MAC address, which is received during the discovery process. Thus, using the MAC address to select the next GO device may result in the fastest group re-formation. However, the device-identifier group re-formation techniques do not take into account the location, movement, signal strength, or connectivity of peer devices in the group. Hence, selecting the next GO device based on device identifiers does not guarantee that each device in the group can connect to the next GO device. Hence, techniques described below select the next GO device by taking into account other considerations, such as signal strength, positioning, and movement of the devices in the group.

Having discussed device-identifier group-re-formation techniques, consider now a discussion of device-detection group re-formation techniques.

Device-Detection Group Re-Formation Techniques

In one or more implementations, peer devices in a peer-to-peer group implement device-detection group re-formation techniques to automatically re-form the group when the GO device is lost. The device-detection group re-formation techniques select the peer device that is able to detect the highest number of peer devices as the next GO device. Selecting the next GO device using device-detection group re-formation techniques ensures that the next GO device is selected such that the most peer devices in the group may connect to the next GO device to re-form the group.

Figure 5:
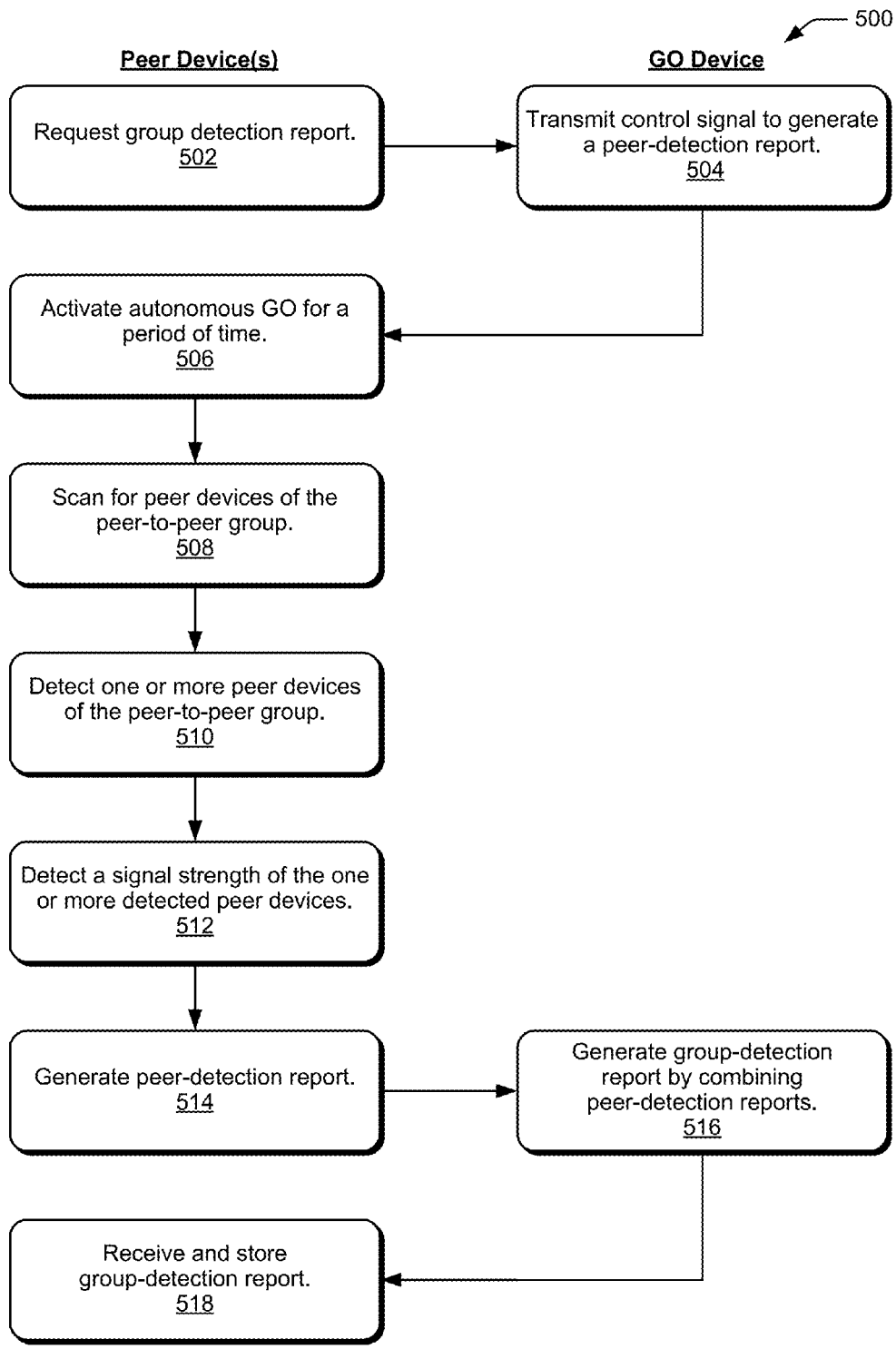
FIG. 5 is a flowchart of a representative method 500 for device-detection group re-formation techniques.

FIG. 5 is a flowchart of a representative method 500 for device-detection group re-formation techniques. The order in which operations of this method is shown or described is not intended to be construed as a limitation, and any number or combination of the described method operations can be combined in any order to implement a method, or an alternate, including that illustrated by FIG. 5.

At 502, a group detection report is requested. For example, peer module 116 at one of peer devices 106, 108, 110, or 112 transmits the request to GO device 104 for a group detection report. In some cases, peer module 116 at the peer device generates the request responsive to detecting a fading connectivity with GO device 104.

At 504, the GO device transmits a control signal to the peer devices in the group to generate a peer-detection report. For example, peer module 116 at GO device 104 transmits a control signal to peer devices 106, 108, 110, and 112 in peer-to-peer group 102 that causes each peer device to generate a peer-detection report. In one or more implementations, in addition to transmitting the control signal when the request is received, GO device 104 may periodically transmit the control signal to the peer devices in peer-to-peer group 102.

Responsive to receiving the command, at 506 the peer devices activate autonomous GO for a period of time. For example, peer module 116 at each peer device 106 through 112 activates autonomous GO for a period of time, such as 5 seconds. By activating autonomous GO, each peer device enables itself to be detected by the other peer devices in the group.

At 508, the peer devices scan for peer devices of the peer-to-peer group, and at 510 one or more peer devices are detected. For example, peer module 116 at each peer device 106, 108, 110, and 112 scans for and detects other peer devices in peer-to-peer group 102. It is to be noted that because each peer device in the group has been instructed to activate autonomous GO, the peer devices are able to detect peer devices of peer-to-peer group 102 that are within range.

At 512, a signal strength of the one or more detected peer devices may also be detected. For example, peer module 116 at each peer device 106, 108, 110, and 112 detects a signal strength of each device detected at step 510. In one or more implementations, the signal strength may be a received signal strength indicator ("RSSI") which is a measurement of the power present in a received radio signal.

Figure 6A:
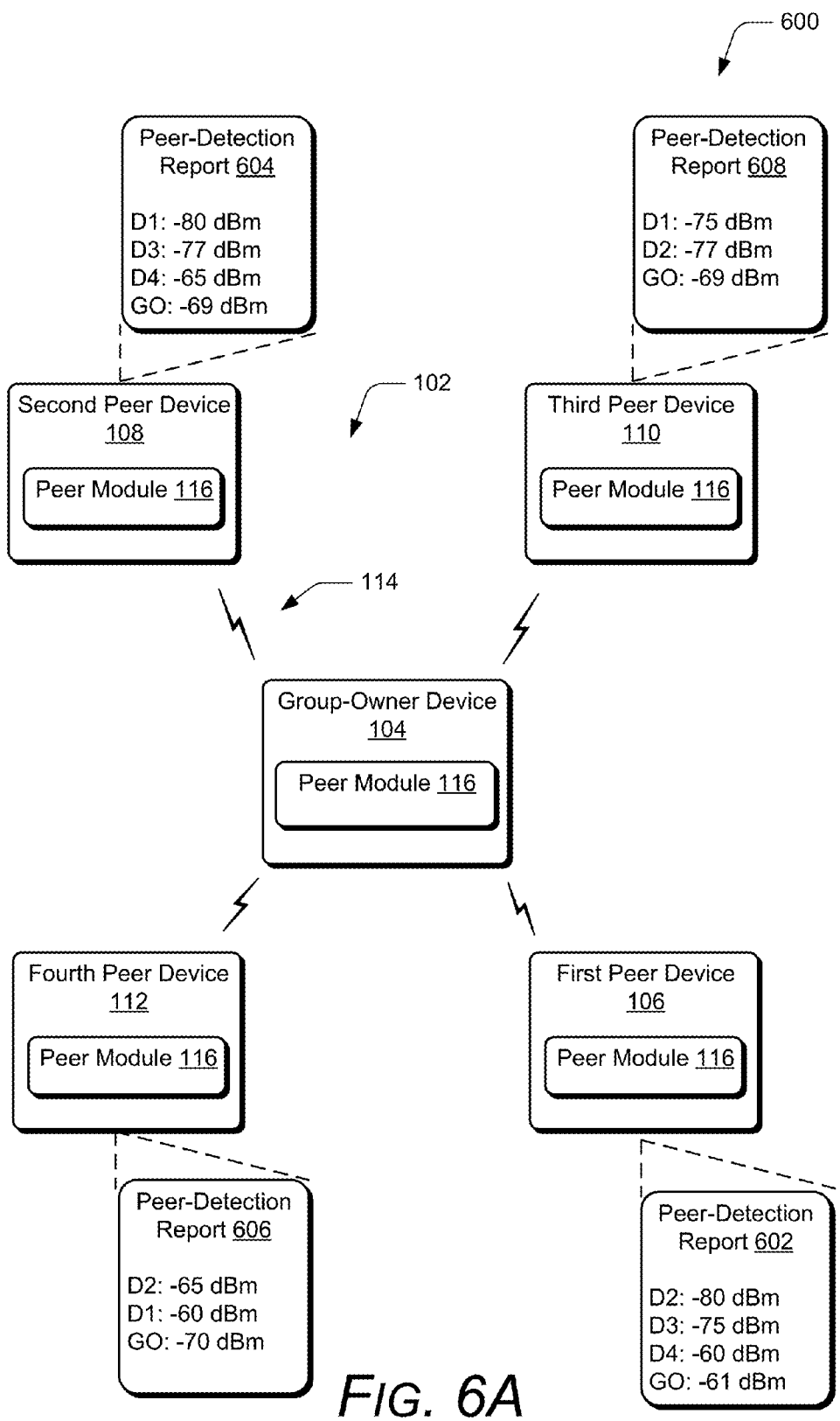
FIGS. 6A and 6B illustrate an example system for re-forming a peer-to-peer group using device-detection group re-formation techniques.
Figure 6B:
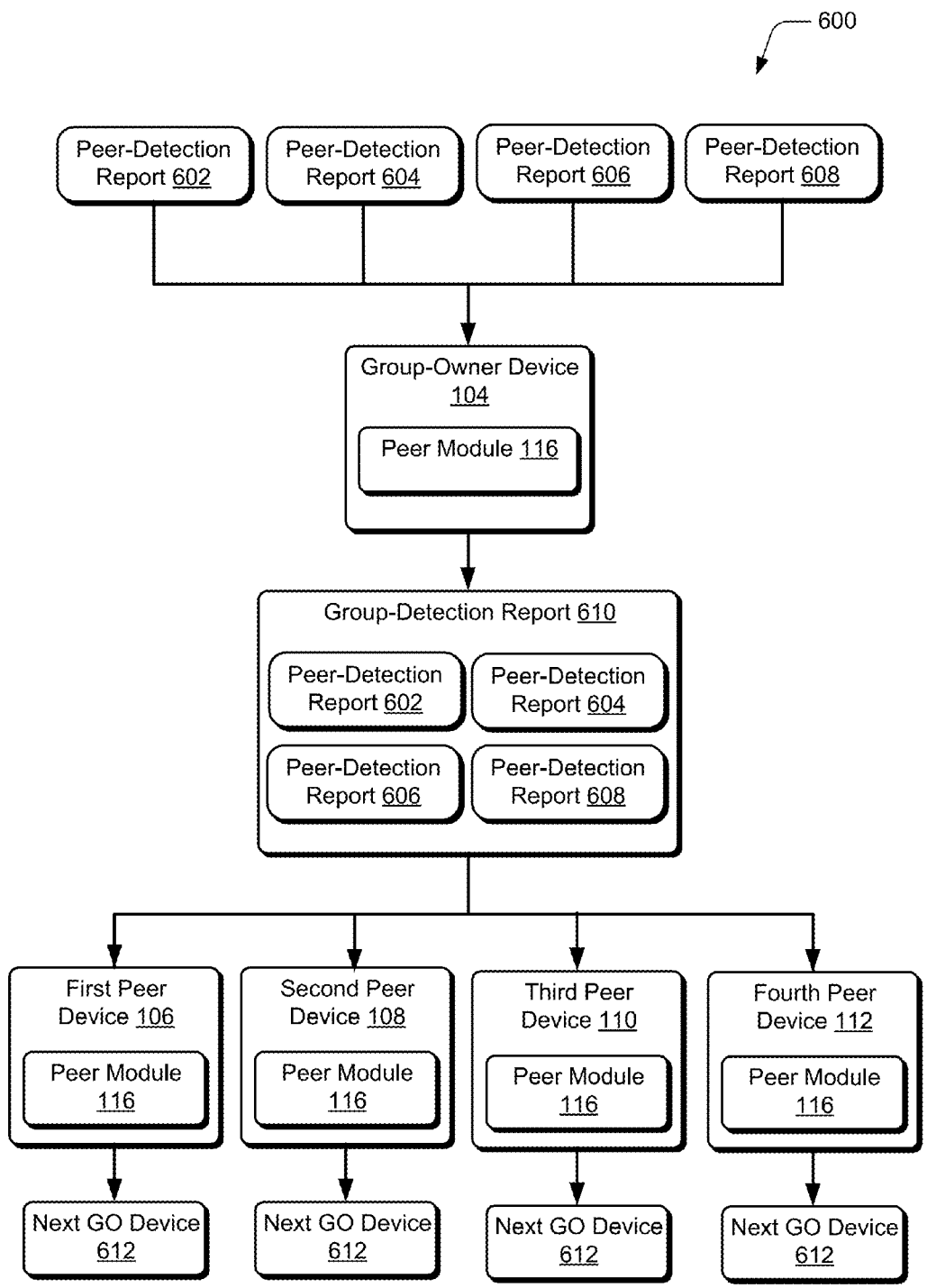

At 514, the peer devices generate peer-detection reports. For example, peer module 116 at each peer device generates a peer-detection report. The peer-detection report identifies each detected peer device. In addition, the peer-detection report may identify the corresponding signal strength (e.g., the RSSI) of each detected peer device;

In order to better understand this concept, consider FIGS. 6A and 6B which illustrate an example system 600 for re-forming a peer-to-peer group using device-detection group re-formation techniques. In example system 600, peer devices 106, 108, 110, and 112 generate peer-detection reports 602, 604, 608, and 606, respectively. The peer-detection reports indicate devices that were detected by each peer device as well as a signal strength of each detected device.

In FIG. 6A, for example, first peer device 106 generates a peer-detection report 602 with four detected devices. The peer-detection report 602 indicates that second peer device 108 was detected with a signal strength of −80 dBm, third peer device 110 was detected with a signal strength of −75 dBm, fourth peer device 112 was detected with a signal strength of −60 dBm, and GO device 104 was detected with a signal strength of −61 dBm.

Additionally, second peer device 108 generates a peer-detection report 604 with four detected devices. The peer-detection report 604 indicates that first peer device 106 was detected with a signal strength of −80 dBm, third peer device 110 was detected with a signal strength of −77 dBm, fourth peer device 112 was detected with a signal strength of −65 dBm, and GO device 104 was detected with a signal strength of −69 dBm.

Additionally, third peer device 110 generates a peer-detection report 608 with three detected devices. The peer-detection report 608 indicates that first peer device 106 was detected with a signal strength of −75 dBm, second peer device 108 was detected with a signal strength of −77 dBm, and GO device 104 was detected with a signal strength of −69 dBm.

Additionally, fourth peer device 112 generates a peer-detection report 606 with three detected devices. The peer-detection report 606 indicates that second peer device 108 was detected with a signal strength of −65 dBm, first peer device 106 was detected with a signal strength of −60 dBm, and GO device 104 was detected with a signal strength of −70 dBm.

Each peer device then transmits its peer-detection report back to GO device 104. Returning to FIG. 5, at 516 the GO device generates a group detection report. In FIG. 6B, for example, peer module 116 at GO device 104 generates a group detection report 610 by combining the peer-detection reports 602, 604, 606, and 608 received from peer devices 106, 108, 112, and 110. Thus, the group detection report 610 indicates, for each peer device in the peer-to-peer group, peer devices in the peer-to-peer group that the peer device is able to detect. In addition, the group detection report 610 may further include a detected signal strength of each of the detected peer devices. Peer module 116 at GO device 116 then transmits the group detection report 610 back to each peer device in peer-to-peer group 102.

Returning to FIG. 5, at 518 each peer device receives and stores the group detection report. As described with regards to FIG. 7, when the GO device is lost, a next GO device can be selected based on information contained in the group detection report.

Figure 7:
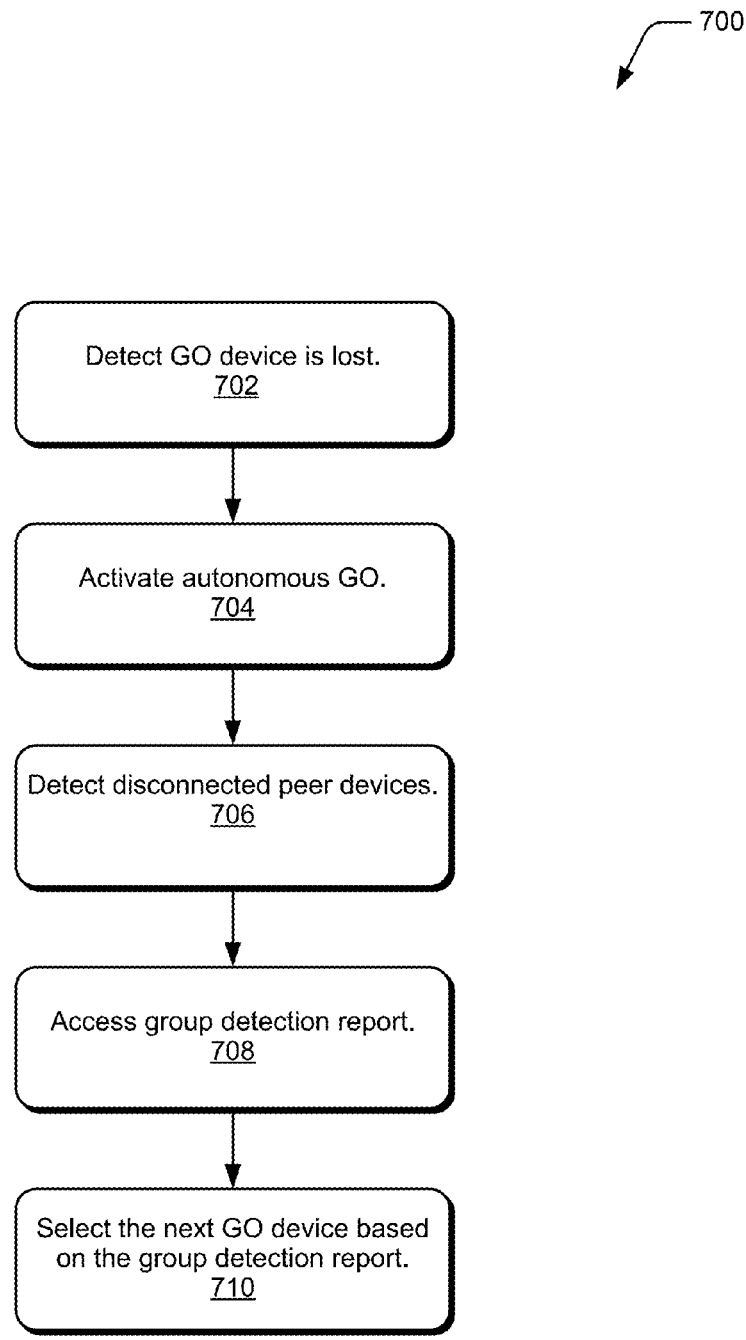
FIG. 7 is an additional flowchart of a representative method for device-detection group re-formation techniques.

FIG. 7 is an additional flowchart of a representative method 700 for device-detection group re-formation techniques. The order in which operations of this method is shown or described is not intended to be construed as a limitation, and any number or combination of the described method operations can be combined in any order to implement a method, or an alternate, including that illustrated by FIG. 7.

At 702, loss of the GO device is detected. For example, peer module 116 executed at one or more of peer devices 106, 108, 110, and 112 detects that GO device 104 is lost when peer module 116 stops receiving beacon signals from GO device 104.

At 704, responsive to detecting loss of the GO device, the peer devices in the group activate autonomous GO. For example, peer module 116 at each peer device 106, 108, 110, and 112 activates autonomous GO.

In one or more implementations, the loss of GO is detected by suddenly detecting that beacon signals from the GO device are no longer being received due to the GO device being powered off. In these cases, each peer device may detect the loss of the GO device at substantially the same time. Thus, each peer device may activate autonomous GO at substantially the same time.

Alternately, the loss of the GO may be detected by gradually detecting that that beacon signals from the GO device are weakening as the GO device moves out of range of the first peer device. In these cases, each peer device may detect the loss of the GO device at different times as the GO device moves out of range of each device. As such, each peer device may activate autonomous GO at different times.

At 706, the disconnected peer devices detect one or more other disconnected peer devices in the group. For example, peer module 116 at each peer device 106, 108, 110, and 112 scans to detect other disconnected peer devices of peer-to-peer group 102. It is to be appreciated that because each disconnected peer device activates autonomous GO at step 704, to detect the disconnected peer devices, each peer module 116 simply scans for devices that have activated autonomous GO.

At 708, the peer devices access a group detection report. For example, peer devices 106, 108, 110, and 112 access group detection report 610 that was previously received from GO device 104. The group detection report 610 indicates, for each peer device in the peer-to-peer group, peer devices in the peer-to-peer group that the peer device is able to detect. In addition, the group detection report 610 may further include a detected signal strength of each of the detected peer devices.

At 710 a next GO device is selected based on the group detection report. For example, peer module 116 at each peer device selects a next GO device 612, from the detected peer devices, based on the group detection report 610 previously received from GO device 104.

In one or more implementations, peer module 116 selects the disconnected peer device with a highest number of detected peer devices in the group detection report 610 as the next GO device 612. For example, if only one peer device in the group detects each of the other peer devices in the group, then this peer device will be selected as the next GO device by peer module 116.

In some cases, however, multiple peer devices may detect the same number of peer devices. In FIG. 6A, for example, first peer device 106 and second peer device 108 each reported the same number of detected devices. Thus, either first peer device 106 or second peer device 108 may be a suitable choice for the next GO device because all of the other peer devices in peer-to-peer group 102 will be able to connect to either device.

Thus, in one or more implementations, if two or more disconnected peer devices have the same number of detected peer devices in the group detection report, then peer module 116 selects the next GO device based on the aggregate signal strength of the detected peer devices. For example, the aggregate signal strength can be calculated as a summation of the signal strengths for the peer devices. Then, the peer device with the lowest aggregate signal strength can be selected as the next GO device. For instance, in example system 600, first peer device 106 has an aggregate signal strength of −215 dBm (−80 dBm+−75 dBm+−60 dBm), and second peer device 108 has an aggregate signal strength of −222 dBm (−80 dBm+−77 dBm+−65 dBm). In this example, therefore, first peer device 106 is selected as the next GO device because the aggregate signal strength of first peer device 106 is lower than the aggregate signal strength of second peer device 108.

In one or more implementations, if multiple peer devices detect the same number of peer devices and have the same aggregate signal strength, then a tiebreaker is used to select the next GO device. For example, the peer device with the higher MAC address may be selected as the next Go device in the case of a tiebreaker.

After selecting the next GO device, the peer device that is selected as the next GO device maintains the autonomous GO to enable other peer devices in the group to connect to the next GO device. The other peer devices in peer-to-peer group 102 then dissolve the autonomous GO and connect to the next GO device to re-from the group.

Having discussed device-detection group re-formation techniques, consider now a discussion of device-motion group re-formation techniques.

Device-Motion Group Re-Formation Techniques

In one or more implementations, peer devices in a peer-to-peer group implement device-motion group re-formation techniques to automatically re-form the group when the GO device is lost. The device-motion group re-formation techniques select the next GO device by detecting motion of peer devices in the peer-to-peer group. In one or more implementations, the original peer-to-peer group may be re-formed into two or more groups as clusters of peer devices move in different directions.

Figure 8:
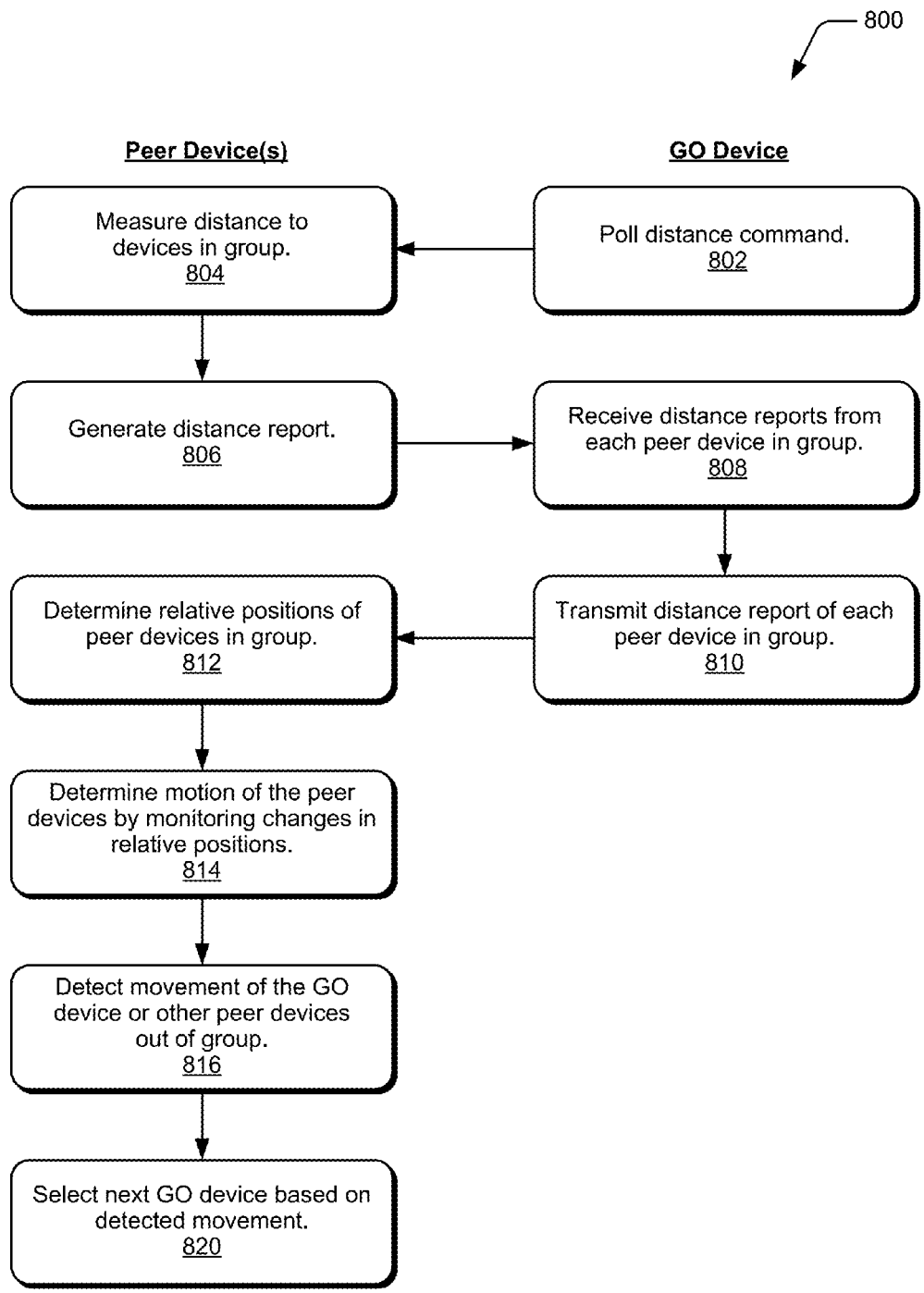
FIG. 8 is a flowchart of a representative method for device-motion group re-formation techniques.

FIG. 8 is a flowchart of a representative method 800 for device-motion group re-formation techniques. The order in which operations of this method is shown or described is not intended to be construed as a limitation, and any number or combination of the described method operations can be combined in any order to implement a method, or an alternate, including that illustrated by FIG. 8.

At 802, the GO device transmits a poll distance command to each peer device in the group. For example, peer module 116 at GO device 104 transmits a poll distance command to peer devices 106, 108, 110, and 112. The poll distance command may be periodically sent by GO device 104 or may be transmitted responsive to receiving a request from one of the peer devices in peer-to-peer group 102.

At 804, each peer device measures distances to other peer devices in the group. For example, peer module 116 at first peer device 106 measures distances from the first peer device 106 to GO device 104 (D1-GO), from the first peer device 106 to second peer device 108 (D1-D2), from the first peer device 106 to third peer device 110 (D1-D3), and from the first peer device 106 to fourth peer device 112 (D1-D4). As another example, peer module 116 at second peer device 108 measures distances from the second peer device 108 to GO device 104 (D2-GO), from the second peer device 108 to first peer device 106 (D2-D1), from the second peer device 108 to third peer device 110 (D2-D3), and from the second peer device 108 to fourth peer device 112 (D2-D4).

Peer module 116 can determine the distances to peer devices in peer-to-peer group 102 from 802.11v reports or time-of-arrival based inter-device round trip time ("RTT") ranging which provides the relative distances of each peer device from each other. The RTT information can be directly inferred by peer module 116 at each peer device during link-idle conditions of the connection, thereby alleviating the need for the peer devices to implement device beaconing to ascertain range information.

At 806, each peer device generates a distance report, and transmits the distance report to the GO device. For example, peer module 116 at first peer device 106 generates a distance report that includes the distances D1-GO, D1-D2, D1-D3, and D1-D4. Similarly, peer module 116 at second peer device 108 generates a distance report that includes the distances D2-GO, D2-D1, D2-D3, and D2-D4. It is to be appreciated that third peer device 110 and fourth peer device 112 may also generate and transmit corresponding distance reports to GO device 104.

At 808, the GO device receives the distance reports from each peer device in the group, and at 810 the GO device transmits the received distance reports to each peer device in the group. For example, GO device 104 transmits distance reports received from second peer device 108, third peer device 110, and fourth peer device 112 to first peer device 106. Similarly, GO device 104 transmits distance reports received from first peer device 106, third peer device 110, and fourth peer device 112 to second peer device 108. Thus, at the end of this exchange, each peer device in peer-to-peer group 102 knows the distance of each other peer device in peer-to-peer group 102 as measured by each peer device.

At 812, each peer device may determine relative positions of the peer devices in the group. For example, using the generated distance report and the distance reports received from GO device 104 at step 810, peer module 116 at each peer device 106, 108, 110, and 112 may construct a position map that indicates how the peer devices are relatively oriented by triangulating the distance measurements contained in the distance reports.

At 814, the peer devices determine motion of other peer devices in the group by monitoring changes in the relative positions of the peer devices. For example, peer module 116 at first peer device 106 can determine motion of second peer device 108 by detecting changes in the relative position of second peer device 108.

At 816, movement of the GO device or the peer devices out of the group is detected. For example, based on the motion detected at step 814, peer module 116 can determine when devices are moving out of range of peer-to-peer group 102.

At 818, the next GO device is selected based on the movement of peer devices out of the group. For example, peer module 116 at each peer device 106, 108, 110, or 112 can select the next GO device based on movement of the peer devices out of peer-to-peer group 102. The peer-to-peer group 102 can then be re-formed by connecting to the next GO device, as described throughout.

In some cases, a peer-to-peer group may be re-formed into two or more groups based on movement of the peer devices out of the group. Peer module 116 can determine an optimal selection of GO devices if a group of devices breaks into multiple device clusters as they move out of the group using the relative motion of the devices. Peer module 116 can then determine the number of next GO devices and select which device becomes the next GO device for new groups.

Figure 9:
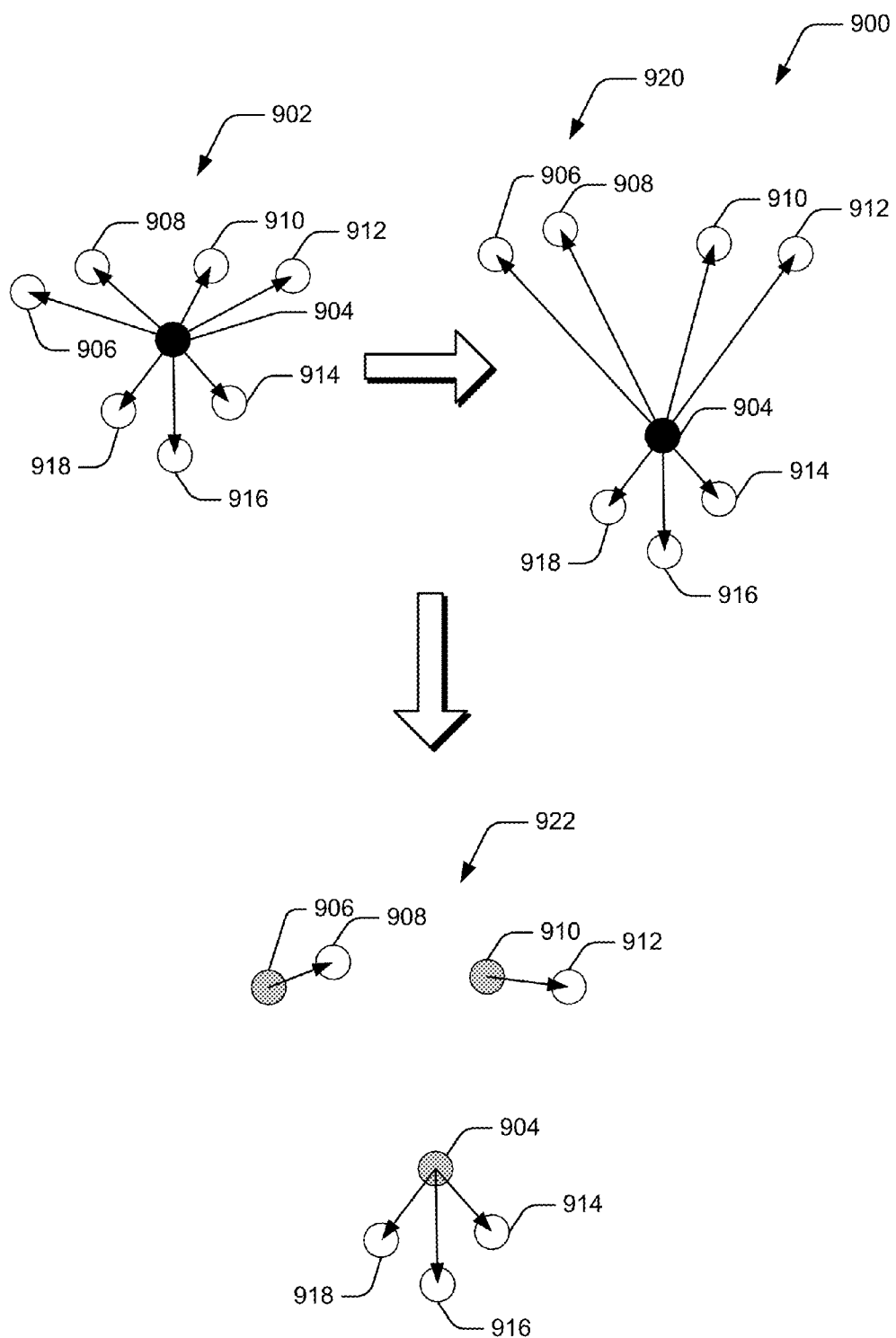
FIG. 9 illustrates an example of re-forming a peer-to-peer group into multiple groups.

Consider for example, FIG. 9 which illustrates an example 900 of re-forming a peer-to-peer group into multiple groups.

In this example, at a first stage 902, a group is formed that includes a GO device 904, and peer devices 906, 908, 910, 912, 914, 916, and 918.

At a second stage 920, each of the devices 904 through 918 begins to move in clusters, which movement can be detected by peer module 116 at each device as described in method 800. For example, peer devices 906 and 908 move in a first direction out of the group, peer devices 910 and 912 move in a second direction out of the group, and GO device 904 and peer devices 914, 916, and 918 move in a third direction out of the group. This may occur, for example, when users exit a meeting and head back to different areas or floors of an office building.

In this example, peer module 116 executing at each device can implement device-motion group re-formation techniques to re-form the peer devices into three groups. To do so, the different groups can be identified based on the motion of the devices. Then, a next GO device can be selected for each group.

In one or more implementations, peer module 116 may implement device-detection group re-formation techniques to select the next GO device for a particular group. To do so, peer module 116 identifies the number of new peer-to-peer groups. Then, for each new peer-to-peer group, peer module 116 selects the next GO device as the device with a highest number of detected peer devices in the group detection report 610. Or, if two or more peer devices in a particular group have the same number of detected peer devices in the group detection report, then peer module 116 selects the next GO device based on the aggregate signal strength of the detected peer devices.

Thus, at a third stage 922, peer devices 906 and 908 form a first new group with peer device 906 as the GO device. Peer devices 910 and 912 form a second new group with peer device 910 as the GO device. In this example, peer devices 914, 916, and 918 do not need to form a new group because they are never disconnected from GO device 904 by virtue of moving in the same direction as GO device 904.

In one or more implementations, the re-group selection may be based on the relative motion among a group of devices. Peer module 116 can infer the relative motion using a sensor on the peer device, such as an accelerometer or a magnetometer. These sensors provide the relative displacements of the peer device over a period of time. Peer module 116 can use this information to compute the group disintegration.

For example, the magnetometer and accelerometer on a peer device may be used by peer module 116 to determine the orientation of the peer device. Then, by combining the orientation of the peer device with signal strength information, peer module 116 can build a map that shows how the relative motion between peer devices causes changes in the signal strength. When any peer device moves significantly (e.g., greater than one foot), the device shares the new signal characteristics with GO device 104. Peer module 116 at GO device 104 can then build the map and synchronize the data with each peer device in peer-to-peer group 102.

This map can then be used by peer module 116 to detect that a peer device is "moving away" out of the group. A new GO device may then be selected such that the cumulative movement within the set of devices in the new group being formed is minimal.

Having discussed device-motion group re-formation techniques, consider now a discussion of device-capabilities group re-formation techniques.

Device-Capabilities Group Re-Formation Techniques

It is to be noted that some peer devices may be more "powerful" than others in terms of capabilities, such as network capability, computational ability, power constraints, mobility, and so on. Thus, in one or more implementations, peer module 116 may "override" any of the above techniques (e.g., as calculated based on detected devices or detected signal strength) and select the next GO device based on device capabilities or current device state (e.g., type of wireless local area network chipset, antenna type, antenna range, Wi-Fi™ parameters, current battery levels, or processing power). For example, peer module 116 may select the next GO device based on the current battery levels of the devices. Thus, a device with a high battery level, or a device that is connected to a charger, may be selected as the next GO device. As another example, a device that has better processing capability may be selected as the next GO device. For example, a laptop or a desktop may have better processing power than a smartphone, and thus the laptop or desktop may be selected as the next GO device instead of the smartphone. As another example, a "high end" device may be selected as the next GO device over "low end" devices because the high end device has better device capabilities or a greater number of features.

To do so, peer module 116 may assign a score to each peer device within peer-to-peer group 102. The score may be weighted to include device capabilities. Then, the peer device with the highest score is selected as the next GO device.

Device capabilities that may cause peer module 116 to increase the score may include, by way of example and not limitation, a lesser degree of movement or least radial displacement over a period of time, fewer power constraints which may be based on the device being plugged into a power source, better networking capabilities (e.g., multiple-input-multiple-output capable, capable of very high throughput, dual band, concurrent operation capable), and better computational power (a stronger processor or more memory).

In one or more implementations, module 116 selects the next GO device based at least in part on the number of devices that can connect to the next GO device. Consider, for example, that a peer device may have a limit on the number of devices that can connect to it. Hence, a peer device may not be selected as the next GO device if it is unable to allow connection by each peer device in the peer-to-peer group.

A wide variety of other factors may influence, or override, the selection of the next GO device by peer module 116. Such factors may include, by way of example and not limitation, whether a device is currently connected to an access point (e.g., an 802.11ac or 802.11n access point), the link speed of the access point, or the throughput supported by the access point. Other factors may include whether the device is currently downloading files, the completion percentage of the file downloads, or the number of files still pending for download. Still other factors may include the percentage of current processor usage of the device, or the wide area network carrier of the device.

Having discussed device-capabilities group re-formation techniques, consider now a discussion of an example electronic device that can implement the techniques described herein.

Figure 10:
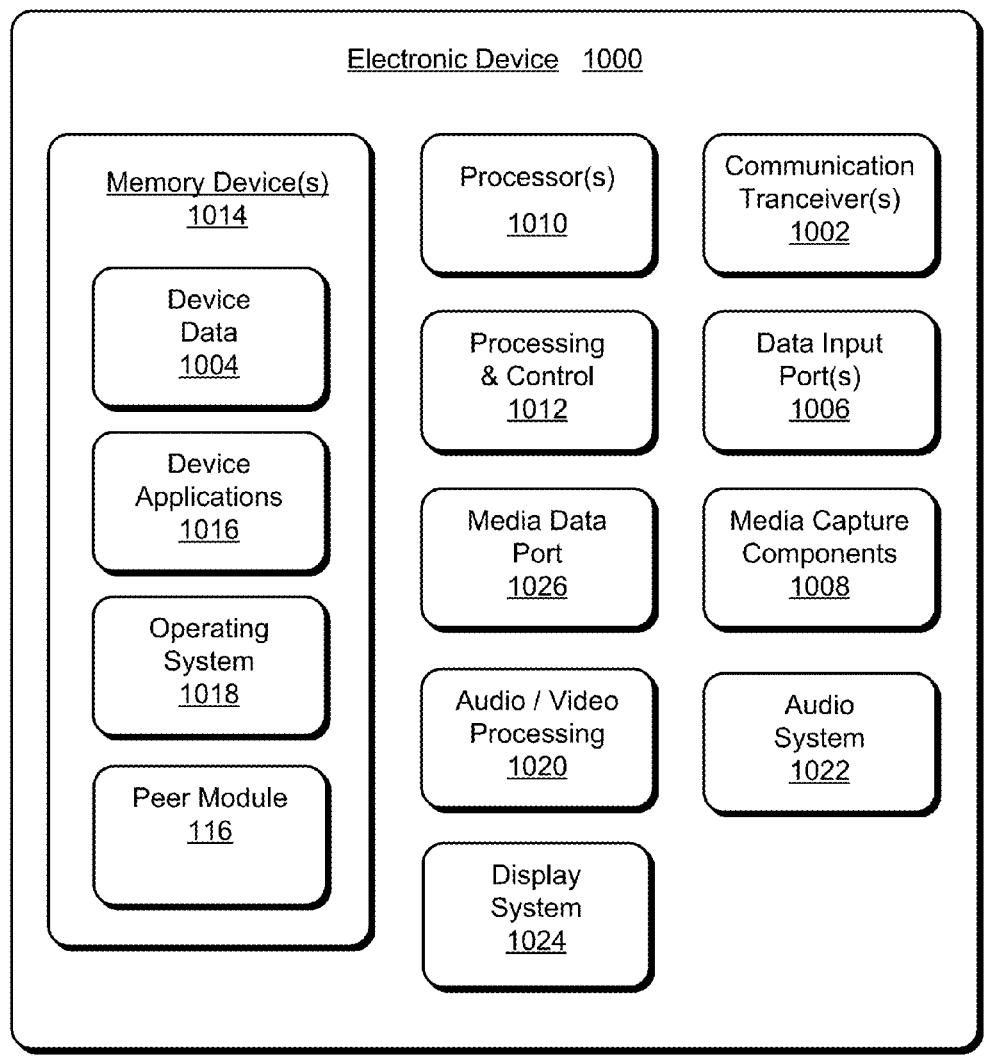
FIG. 10 illustrates various components of an example electronic device that can implement the present techniques.

FIG. 10 illustrates various components of an example electronic device 1000 that can implement the present techniques. For example, the electronic device 1000 may be implemented as any type of peer device described with regards to FIG. 1, such as GO device 104, first peer device 106, second peer device 108, third peer device 110, or fourth peer device 112.

The electronic device 1000 includes communication transceivers 1002 that enable wired or wireless communication of device data 1004, such as received data, data that are being received, and data scheduled for broadcast. Example communication transceivers 1002 include wireless personal-area-network radios compliant with various International Electrical and Electronics Engineers ("IEEE") 802.15 standards, Bluetooth™ standards, or Wi-Fi™ Direct standards, wireless local-area-network radios compliant with any of the various IEEE 802.11 standards, wireless-wide-area-network radios for cellular telephony, wireless-metropolitan-area-network radios compliant with various IEEE 802.16 standards, and wired local-area-network Ethernet transceivers.

The electronic device 1000 may also include one or more data-input ports 1006 via which any type of data, media content, or inputs can be received, such as user-selectable inputs, messages, music, television content, recorded video content, and any other type of audio, video, or image data received from any content or data source. The data-input ports may include universal serial bus ports, coaxial-cable ports, and other serial or parallel connectors (including internal connectors) for flash memory, digital versatile disks ("DVDs"), compact disks, and the like. These data-input ports may be used to couple the electronic device to components, peripherals, or accessories such as microphones or cameras. Additionally, the electronic device 1000 may include media-capture components 1008, such as an integrated microphone to capture audio and a camera to capture still images or video.

The electronic device 1000 includes one or more processors 1010 (e.g., any of microprocessors, controllers, and the like), which process computer-executable instructions to control operation of the device. Alternatively or in addition, the electronic device can be implemented with any one or combination of software, hardware, firmware, or fixed-logic circuitry that is implemented in connection with processing and control circuits, which are generally identified at 1012. Although not shown, the electronic device can include a system bus or data transfer system that couples the various components within the device. A system bus can include any one or combination of different bus structures, such as a memory bus or memory controller, a peripheral bus, a universal serial bus, or a processor or local bus that utilizes any of a variety of bus architectures.

The electronic device 1000 also includes one or more memory devices 1014 that enable data storage, examples of which include random-access memory, non-volatile memory, and a disk storage device. A disk storage device may be implemented as any type of magnetic or optical storage device, such as a hard disk drive, a recordable or rewriteable disc, any type of a DVD, and the like. The electronic device 1000 may also include a mass-storage media device.

A memory device 1014 provides data-storage mechanisms to store the device data 1004, other types of information or data, and various device applications 1016 (e.g., software applications). For example, an operating system 1018 can be maintained as software instructions within a memory device and executed on the processors 1010. The device applications may also include a device manager, such as any form of a control application, software application, signal-processing and control module, code that is native to a particular device, a hardware abstraction layer for a particular device, and so on. In some implementations, memory device 1014 further includes peer module 116 of FIG. 1.

The electronic device 1000 also includes an audio or video processing system 1020 that generates audio data for an audio system 1022 or generates display data for a display system 1024. The audio system or the display system may include any devices that process, display, or otherwise render audio, video, display, or image data. Display data and audio signals can be communicated to an audio component or to a display component via a radio-frequency link, S-video link, high-definition multimedia interface, composite video link, component video link, digital video interface, analog audio connection, or other similar communication link, such as media-data port 1026. Additionally, the audio system or the display system may be external components to the electronic device, or alternatively, are integrated components of the example electronic device.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method comprising:
    detecting, at a first peer device of a peer-to-peer group, that a Group Owner ("GO") device of the peer-to-peer group is lost;
    detecting one or more disconnected peer devices of the peer-to-peer group;
    accessing a group detection report that indicates, for each peer device in the peer-to-peer group, peer devices in the peer-to-peer group that the peer device is able to detect; and
    selecting a disconnected peer device with a highest number of detected peer devices in the group detection report as a next GO device.

2. The method of claim 1 wherein the group detection report further includes, for each peer device in the peer-to-peer group, a detected signal strength of each of the detected peer devices.

3. The method of claim 2 wherein the detected signal strength comprises a received signal strength indicator.

4. The method of claim 2 wherein selecting further comprises, if two or more disconnected peer devices have the same number of detected peer devices in the group detection report:
    for each of the two or more disconnected peer devices, aggregating the detected signal strengths of each detected peer device in the corresponding peer-detection report; and
    selecting the peer device of the two or more peer devices as the next GO device based on the aggregated detected signal strengths.

5. The method of claim 1 further comprising activating autonomous GO at the first peer device to enable the other peer devices to detect the first peer device.

6. The method of claim 5 further comprising:
    dissolving the autonomous GO at the first device; and
    connecting to the next GO device to re-form the peer-to-peer group.

7. The method of claim 5 wherein selecting comprises selecting the first peer device as the next GO device, and wherein the method further comprises maintaining the autonomous GO at the first peer device to enable the other peer devices to connect to the first peer device to re-form the peer-to-peer group.

8. The method of claim 1 further comprising, prior to detecting that the GO device of the peer-to-peer group is lost:
    receiving a control signal from the GO device to generate a peer-detection report;

scanning for the other peer devices of the peer-to-peer group;

detecting one or more peer devices of the peer-to-peer group;

detecting a signal strength of the one or more detected peer devices;

generating the peer-detection report, the peer-detection report identifying each detected peer device and the corresponding signal strength of each detected peer device;

transmitting the peer-detection report to the GO device, the GO device configured to generate the group detection report by combining the peer-detection report with one or more other peer-detection reports received from the other peer devices in the peer-to-peer group; and receiving the group detection report from the GO device.

9. The method of claim 8 further comprising prior to receiving the control signal from the GO device:

detecting a loss of connectivity with the GO device; and transmitting a request to the GO device to generate the group detection report, the request causing the GO device to transmit the control signal to each peer device in the peer-to-peer group.

10. The method of claim 1 wherein detecting the loss of the GO device comprises suddenly detecting the loss of the GO device due to the GO device being powered off or losing battery power.

11. The method of claim 1 wherein detecting the loss of the GO device comprises gradually detecting the loss of the GO device as the GO device moves out of range of the first peer device.

12. The method of claim 1 wherein selecting the next GO device further comprises selecting the next GO device based at least in part on one or more device capabilities of the next GO device.

13. The method of claim 1 wherein selecting the next GO device further comprises selecting the next GO device based at least in part on the number of devices that can connect to the next GO device.

14. A method comprising:

measuring, at a first peer device in a peer-to-peer group, distances from the first peer device to a Group Owner ("GO") device and other peer devices in the peer-to-peer group;

generating a distance report that includes the measured distances;

transmitting the distance report to the GO device;

receiving additional distance reports from the GO device, the additional distance reports including additional measured distances between peer devices measured by other peer devices in the peer-to-peer group; and determining relative positions of the GO device and the other peer devices using the distance report and the additional distance reports.

15. The method of claim 14 wherein measuring the distances comprises measuring distances using time-of-arrival-based inter-device round-trip time ranging or using 802.11v reports.

16. The method of claim 14 wherein determining the relative positions further comprises constructing a position map that indicates how the GO device and the other peer devices are relatively oriented by triangulating the measured distances and the additional measured distances.

17. The method of claim 14 further comprising:

determining motion of at least one of the GO device or another peer device by monitoring changes in the relative positions of the GO device and the other peer device; and detecting movement of the at least one of the GO device or the other peer device out of the group based on the determined motion.

18. The method of claim 17 further comprising selecting a next GO device based on the detected movement of the GO device or the other peer device out of the peer-to-peer group.

19. The method of claim 17 wherein detecting movement further comprises:

determining that a cluster of peer devices are moving in a same direction as the first peer device; and selecting a next GO device from the peer devices in the cluster of peer devices based on a highest number of detected peer devices or a highest aggregate signal strength of the next GO device.

20. The method of claim 19 further comprising:

determining that an additional cluster of peer devices are moving out of the peer-to-peer group; and selecting an additional next GO device from the peer devices in the additional cluster of peer devices.

* * * * *